UNITED STATES PATENT OFFICE.

SIGMUND v. KAPFF, OF AACHEN, GERMANY.

CELLULOSE FORMATE.

953,677.

Specification of Letters Patent. Patented Mar. 29, 1910.

No Drawing. Application filed July 24, 1909. Serial No. 509,385.

*To all whom it may concern:*

Be it known that I, SIGMUND VON KAPFF, a subject of the King of Würtemberg, residing at 100 Boxgraben, Aachen, Germany, have invented certain new and useful Improvements Relating to Cellulose Formates; and I do hereby declare the following to be a full, clear, and exact description of the invention.

The subject matter of my invention is an improved process of making cellulose formate.

It is well-known that cotton or cellulose only dissolves in formic acid when sulfuric or hydrochloric acid is added to the formic acid. There are difficulties in recovering such a mixture of inorganic acid and formic acid, and the solution of cellulose in this mixture is subjected, owing to the presence of the strong inorganic acid, to relatively rapid decomposition or still more radical change which makes the employment of this solution for making artificial silk either quite impossible or very difficult and causes great losses. Now the inorganic acid can be separated from the solvent by previously dissolving the cellulose (as such as well as in the form of cotton or of mercerized cotton or in the form of oxycellulose, hydrocellulose, hydro-oxycellulose, so that by the term "cellulose" all such forms are included) in sulfuric acid of a definite degree of concentration, namely about 55° Baumé, and subsequent precipitation of the cellulose by water. The cellulose dissolved in the sulfuric acid and precipitated by water is completely liberated from sulfuric acid by washing with water. Nevertheless it dissolves in formic acid without other admixtures such as sulfuric or hydrochloric acid being necessary. The cellulose can be separated from this solution in known manner as artificial silk and the like and the solvent can be recovered without change and almost without loss.

Example: One part by weight of cellulose (*e. g.* cotton) is added to about thirty parts by weight of sulfuric acid of approximately 55° Baumé until a thick, viscous paste is obtained. This is poured slowly into water, washed, and the separated cellulose is then poured off and dried. The cellulose thus obtained dissolves in from ten to thirty minutes (varying with different temperatures) in formic acid of approximately 100 per cent., a mixture of various cellulose formates, *i. e.* cellulose monoformate, diformate and triformate, being formed.

The proportions stated in the example may obviously be widely varied without affecting the operation of the process.

I claim:

1. The hereindescribed process of making cellulose formate, which consists in dissolving cellulose in sulfuric acid, precipitating it from the solution thus obtained, separating the precipitated cellulose from the liquid, washing the cellulose free from sulfuric acid, and dissolving it in formic acid.

2. The hereindescribed process of making cellulose formate, which consists in dissolving cellulose in sulfuric acid of approximately fifty-five degrees Baumé, precipitating it from the solution thus obtained, separating the precipitated cellulose from the liquid, washing the cellulose free from sulfuric acid, and dissolving it in formic acid.

3. The hereindescribed process of making cellulose formate, which consists in dissolving cellulose in sulfuric acid of approximately fifty-five degrees Baumé, precipitating it from the solution thus obtained, separating the precipitated cellulose from the liquid, washing it free from sulfuric acid and drying the same, and then dissolving it in formic acid.

In testimony whereof I have signed my name to this specification, in the presence of two subscribing witnesses.

SIGMUND v. KAPFF.

Witnesses:
HEINRICH SCHMID,
HENRY QUADFLIEG.